United States Patent
Park (10) Patent No.: US 11,276,905 B2
(45) Date of Patent: Mar. 15, 2022

(54) BATTERY CELL HAVING DUAL WELDING STRUCTURES

(71) Applicant: LG CHEM, LTD., Seoul (KR)

(72) Inventor: Jong Pil Park, Daejeon (KR)

(73) Assignee: LG Energy Solution, Ltd.

( * ) Notice: Subject to any disclaimer, the term of this patent is extended or adjusted under 35 U.S.C. 154(b) by 233 days.

(21) Appl. No.: 16/067,844

(22) PCT Filed: Nov. 24, 2017

(86) PCT No.: PCT/KR2017/013545
§ 371 (c)(1),
(2) Date: Jul. 3, 2018

(87) PCT Pub. No.: WO2018/101682
PCT Pub. Date: Jun. 7, 2018

(65) Prior Publication Data
US 2019/0013506 A1    Jan. 10, 2019

(30) Foreign Application Priority Data

Nov. 30, 2016 (KR) .......................... 10-2016-0161121

(51) Int. Cl.
*H01M 50/531* (2021.01)
*H01M 10/04* (2006.01)
(Continued)

(52) U.S. Cl.
CPC ......... *H01M 50/531* (2021.01); *H01M 10/04* (2013.01); *H01M 10/0472* (2013.01);
(Continued)

(58) Field of Classification Search
CPC ........ H01M 2/0275; H01M 2/06; H01M 2/26; H01M 50/54; H01M 50/172;
(Continued)

(56) References Cited

U.S. PATENT DOCUMENTS

2005/0287430 A1* 12/2005 Kim .................... H01M 50/531
429/161
2007/0117009 A1*  5/2007 Yamauchi ......... H01M 10/0525
429/160
(Continued)

FOREIGN PATENT DOCUMENTS

JP   S58113268 U   8/1983
JP   08096841 A   4/1996
(Continued)

OTHER PUBLICATIONS

Office Action in corresponding Korean Patent Application No. 10-2016-0161121, dated May 1, 2019, 6 pages.
(Continued)

*Primary Examiner* — Miriam Stagg
*Assistant Examiner* — Lilia Nedialkova
(74) *Attorney, Agent, or Firm* — Lerner, David, Littenberg, Krumholz & Mentlik, LLP (57) ABSTRACT

The present disclosure provides a battery cell including: two or more electrode groups having a structure in which electrodes including a positive electrode, a negative electrode, and a separator interposed between the positive electrode and the negative electrode are stacked, wherein each of the electrode groups includes an electrode tab junction on one side and is electrically connected to an electrode lead drawn to an outside of a battery case via a conductive connecting member, and has a structure including a first welding junction formed between one end of the conductive connecting member and the electrode tab junction and a second welding junction formed between the other end of the conductive connecting member and the electrode lead.

12 Claims, 6 Drawing Sheets

(51) Int. Cl.
*H01M 50/54* (2021.01)
*H01M 50/172* (2021.01)
*H01M 50/543* (2021.01)

(52) U.S. Cl.
CPC ......... *H01M 50/172* (2021.01); *H01M 50/54* (2021.01); *H01M 50/543* (2021.01)

(58) Field of Classification Search
CPC .. H01M 50/531; H01M 50/543; H01M 10/04; H01M 10/0472; Y02E 60/10; Y02P 70/50
See application file for complete search history.

(56) References Cited

U.S. PATENT DOCUMENTS

| | | | | |
|---|---|---|---|---|
| 2007/0134551 | A1* | 6/2007 | Cyr | H01M 2/266 429/160 |
| 2009/0017376 | A1* | 1/2009 | Yamamura | H01M 50/50 429/209 |
| 2009/0197162 | A1* | 8/2009 | Shinyashiki | H01M 50/528 429/161 |
| 2009/0317717 | A1* | 12/2009 | Ryu | H01M 50/531 429/211 |
| 2011/0129718 | A1 | 6/2011 | Lee | |
| 2011/0189534 | A1* | 8/2011 | Kim | H01M 50/172 429/179 |
| 2012/0171525 | A1* | 7/2012 | Guen | H01M 2/0277 429/53 |
| 2013/0224562 | A1* | 8/2013 | Momo | H01G 11/78 429/149 |
| 2016/0336545 | A1 | 11/2016 | Wakimoto et al. | |

FOREIGN PATENT DOCUMENTS

| | | |
|---|---|---|
| JP | 2005005215 A | 1/2005 |
| JP | 2012-209261 A | 10/2012 |
| JP | 2013168238 A | 8/2013 |
| KR | 10-2005-0015922 A | 2/2005 |
| KR | 10-2013-0042954 A | 4/2013 |
| KR | 10-2014-0028337 A | 3/2014 |
| KR | 10-2016-0015751 A | 2/2016 |
| KR | 10-2016-0049827 A | 5/2016 |
| KR | 10-2016-0094009 A | 8/2016 |
| WO | 2014163184 A1 | 10/2014 |

OTHER PUBLICATIONS

Supplemental European Search Report in corresponding European Patent Application No. EP17875721.7, dated May 8, 2019, 10 pages.
International Search Report (PCT/ISA/210) issued in PCT/KR2017/013545, dated Mar. 5, 2018.

* cited by examiner

BATTERY CELL HAVING DUAL WELDING STRUCTURES

TECHNICAL FIELD

The present disclosure relates to a battery cell having dual welding structures.

BACKGROUND ART

As the use of fossil fuels has rapidly increased, the demand for the use of alternative energy, or clean energy, has increased. As a part of this trend, the field where research has been most actively conducted is electrochemical-based power generation and storage.

At present, a typical example of an electrochemical device that utilizes electrochemical energy is a secondary battery, and the areas in which it is used are gradually increasing.

Battery cells may be classified, on the basis of the shape of a battery case, into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of a laminated aluminum sheet.

An electrode assembly mounted in the battery case is a charge-dischargeable power generating device having a laminated structure of positive electrode/separator/negative electrode, and is classified into a jelly-roll type, in which long-sheet type positive electrodes and negative electrodes are wound while separators are interposed therebetween, and a stacked type, in which pluralities of positive electrodes and negative electrodes that each have a predetermined size are sequentially stacked while separators are interposed therebetween.

Figure 1:
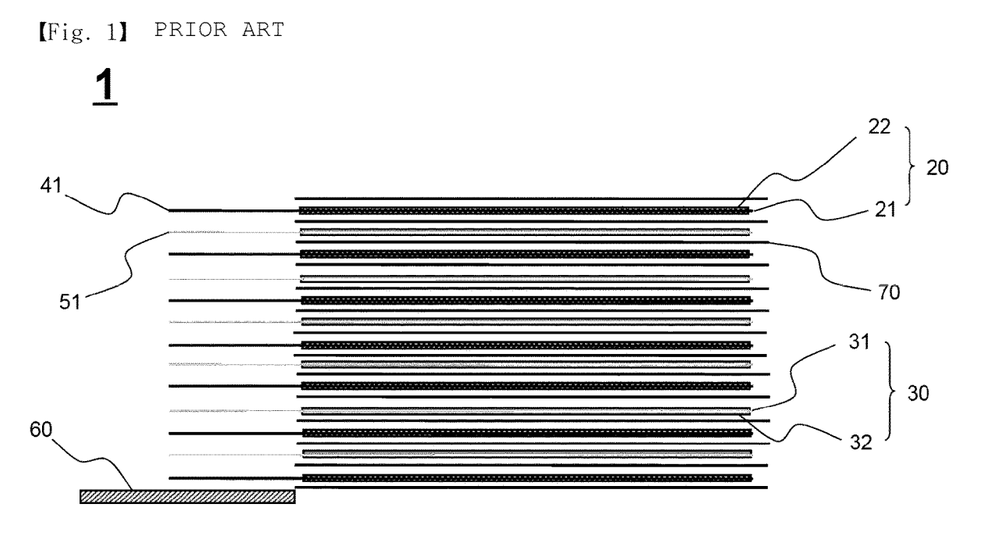
FIG. 1 is a schematic view of a typical structure of a conventional stacked type electrode assembly from a side view.

FIG. 1 schematically shows a side view of a general structure of a typical conventional stacked type electrode assembly.

Referring to FIG. 1, a stacked type electrode assembly 1 has a structure in which a positive electrode 20, on which a positive electrode active material 22 is applied on both surfaces of a positive electrode current collector 21, and a negative electrode 30, on which a negative electrode active material 32 is applied on both surfaces of a negative electrode current collector 31, are sequentially stacked with a separator interposed therebetween.

On one end of each of the positive electrode current collector 21 and the negative electrode current collector 31, a plurality of positive electrode tabs 41 and negative electrode tabs 51 that, in order to be respectively electrically connected to a positive electrode lead 60 and a negative electrode lead (not shown) constituting an electrode terminal of a battery, are not coated with the active material protrude.

Figure 2A:
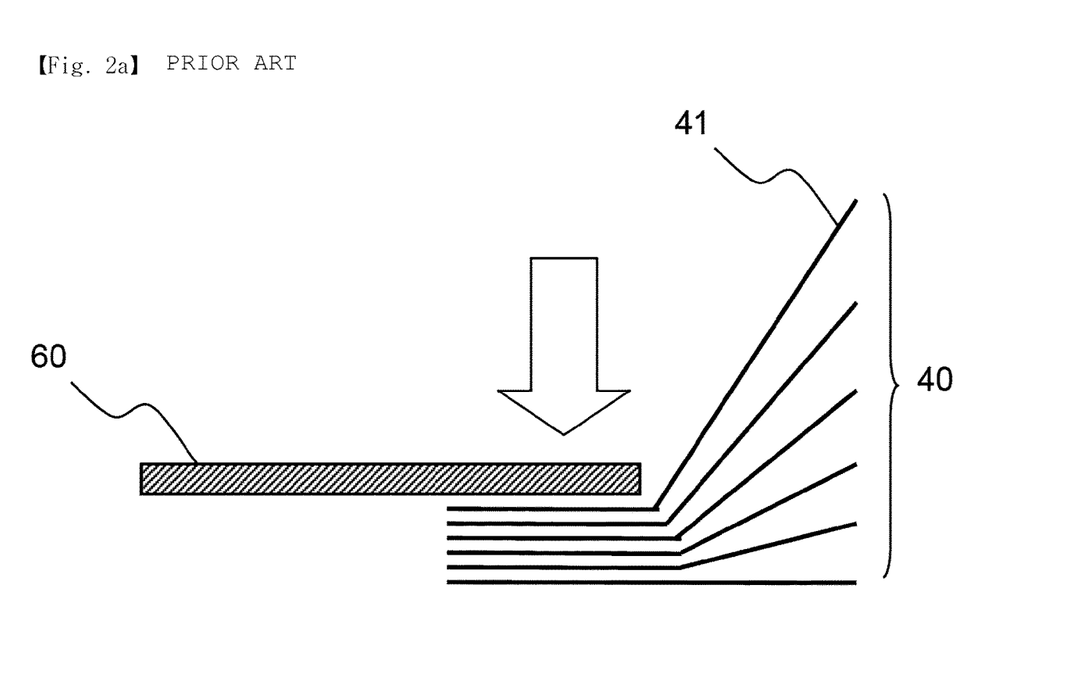
FIGS. 2A and 2B are enlarged views of a portion where positive tabs are coupled to have a dense form and connected to positive leads in the electrode assembly of FIG. 1.
Figure 2B:
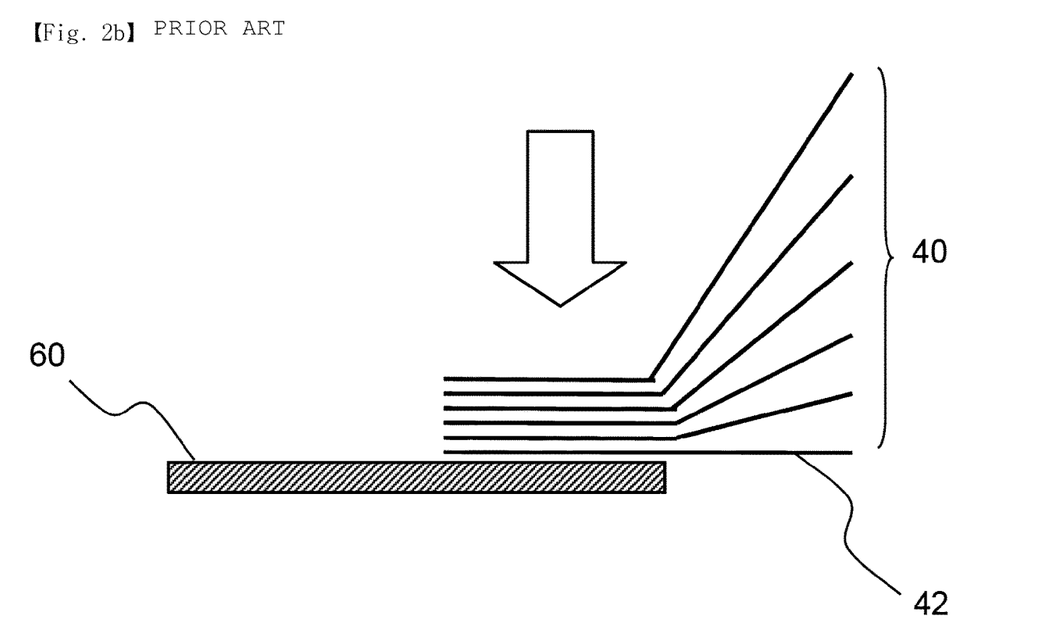

In particular, the positive electrode tabs 41 and the negative electrode tabs 51 are coupled to have a dense form and connected to the positive electrode lead 60 and the negative electrode lead, respectively. This structure may be more easily seen in FIGS. 2A and 2B in which a coupled part of the positive electrode tabs 41 and the positive electrode lead 60 is schematically shown in an enlarged partial view. For convenience of explanation, only the coupling structure of the positive electrode tabs and the positive electrode lead is shown in FIGS. 2A and 2B, but this structure is also employed in a coupled part of the negative electrode tabs and the negative electrode lead.

Referring to these drawings, the positive electrode tabs 40 make contact in a direction of an arrow and are connected to the positive electrode lead 60. The positive electrode lead 60 is generally coupled by welding, and may be coupled while in a state of being positioned on an upper surface of an uppermost positive electrode tab 41, as shown in FIG. 2A, or on a lower surface of a lowermost positive electrode tab 42, as shown in FIG. 2B.

However, in this structure, when a thickness of an electrode group is increased by increasing a number of times electrodes are stacked in order to increase energy density of the battery, the electrode tabs adjacent to an outermost area should be formed long enough to be coupled to the electrode lead. Therefore, an area of an electrode non-coated part used as the electrode tab may be increased, and an area coated with the electrode active material on an electrode current collector may be decreased, and thus a portion of the battery able to be utilized for battery capacity may be reduced.

In order to solve this problem, in a process of shortening a length of the electrode tab, and bending the electrode tabs and tightly joining them to an electrode tab junction, stress is concentrated on the outermost electrode tab with respect to the electrode lead, and thus a bonding force of the electrode tab junction may be weakened, the danger of disconnection may increase, and safety may be deteriorated.

Accordingly, there is a high need for a battery cell capable of improving the energy density of a battery by minimizing the length of an electrode tab, and at the same time, of maintaining a stable connection state between the electrode tab and the electrode lead.

DISCLOSURE

Technical Problem

The present disclosure is provided to solve the above-described problems of the related art and technical problems that have been identified in the past.

The inventors of the present application have conducted intense research and various experiments and have confirmed that when electrode tab junctions formed on one side of each electrode group in a battery case are electrically connected to an electrode lead via a conductive connecting member, the electrode tab junction maintains a stable connection state with the electrode lead without disconnection, and the energy density is increased by increasing an area coated with an electrode active material in a process of minimizing the length of the electrode tab, thereby achieving the present disclosure.

Technical Solution

The present disclosure provides a battery cell including:

two or more electrode groups having a structure in which electrodes including a positive electrode, a negative electrode and a separator interposed between the positive electrode and the negative electrode are stacked, wherein each of the electrode groups includes an electrode tab junction on one side and is electrically connected to an electrode lead drawn to an outside of a battery case via a conductive connecting member, and has a structure including a first welding junction formed between one end of the conductive connecting member and the electrode tab junction and a second welding junction formed between the other end of the conductive connecting member and the electrode lead.

In particular, the first welding junction and the second welding junction may be formed parallel to the electrode lead, and the conductive connecting member may have a bent part bent toward an electrode body or an opposite direction thereof between the first welding junction and the second welding junction.

The conductive connecting member may be made of a metal strip, and the bent part may be, for example, bent so as to have a circular arc shape in a vertical cross section.

In one specific example, a battery cell includes two or more electrode groups having a structure in which electrodes including a positive electrode, a negative electrode, and a separator interposed between the positive electrode and the negative electrode are stacked, wherein each of the electrode groups includes an electrode tab junction on one side, and includes a first welding junction in which an end of the electrode tab junction is directly coupled to an electrode lead drawn to an outside of a battery case and a second welding in which an conductive connecting member is coupled at an opposite position of the first welding junction to the electrode tab junction and the electrode lead.

For example, the first welding junction may have a structure in which a part of the electrode tab junction is coupled to the electrode lead in a bent state, and a size of the second welding junction may be relatively larger than that of the first welding junction.

Optionally, the conductive connecting member may have a structure in which the second welding junction is formed to be in a bent state corresponding to the electrode tab junction and a shape of the outer surface of the electrode lead.

As described above, the electrode groups included in the battery cells having two structures may be composed of a first electrode group and a second electrode group; and the first electrode group and the second electrode group may be arranged symmetrically with respect to the electrode lead.

In particular, in the electrodes forming each of the electrode groups, bent angles of an electrode non-coated part extending from an end of an active material coated part to the electrode tab junction may be symmetrical with respect to a horizontal axis passing through the center of the electrode group.

For example, outermost electrodes of each of the electrode groups may have a bent angle of about 20 to 50 degrees, but the present disclosure is not limited thereto.

Optionally, a part of the electrode tab junction may be bent and coupled to the electrode lead in a state in which the bent angles of the electrode non-coated part are symmetrical with respect to the horizontal axis passing through the center of the electrode group.

Upper and lower surfaces of the electrode lead may have an insulating film attached thereto for securing electrical insulation in the battery case.

The electrode groups may be sealed together with an electrolytic solution within the battery case, which is made of a laminate sheet, and each of the electrode groups may have a stacked type electrode group and a stacked/folding type electrode group.

Further, the present disclosure includes a device including the battery cell as a power source.

Advantageous Effects

As described above, a battery cell according to the present disclosure have a structure in which an electrode tab junction formed on one side of each electrode group is electrically connected to an electrode lead via a conductive connecting member, and therefore it is possible to increase the energy density by shortening the length of the electrode tab and increasing the area coated with an electrode active material. Also, by preventing an electrode non-coated part from excessively bending for forming the electrode tab junction and relieving the stress acting on the electrode tab, a stable connection state of a tab-lead coupled part can be maintained and the safety of a battery can be secured.

DETAILED DESCRIPTION OF THE PREFERRED EMBODIMENTS

Hereinafter, embodiments of the present disclosure will be described with reference to the accompanying drawings. However, the description provided herein is for better understanding of the present disclosure, and the scope of the present disclosure is not limited thereto.

Figure 3A:
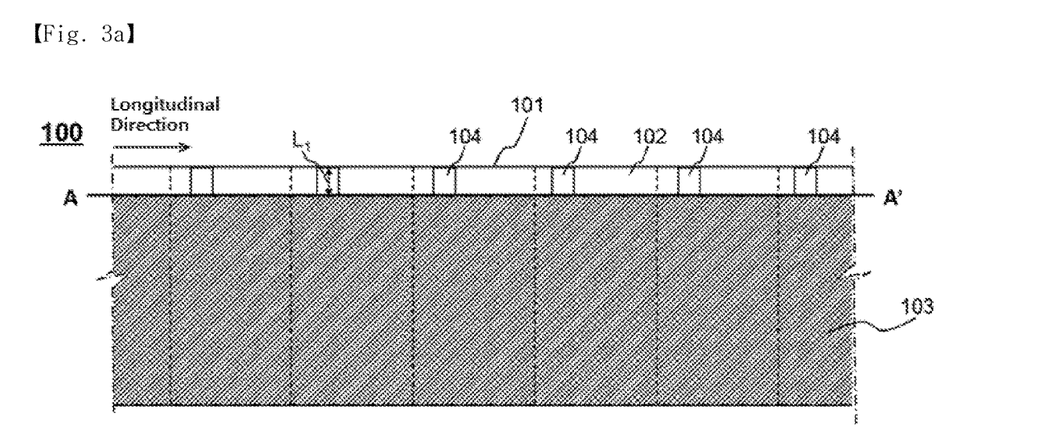
FIG. 3A is a schematic view of a positive electrode prepared by applying a positive electrode active material to a positive electrode current collector included in an electrode group according to an embodiment of the present disclosure.
Figure 3B:
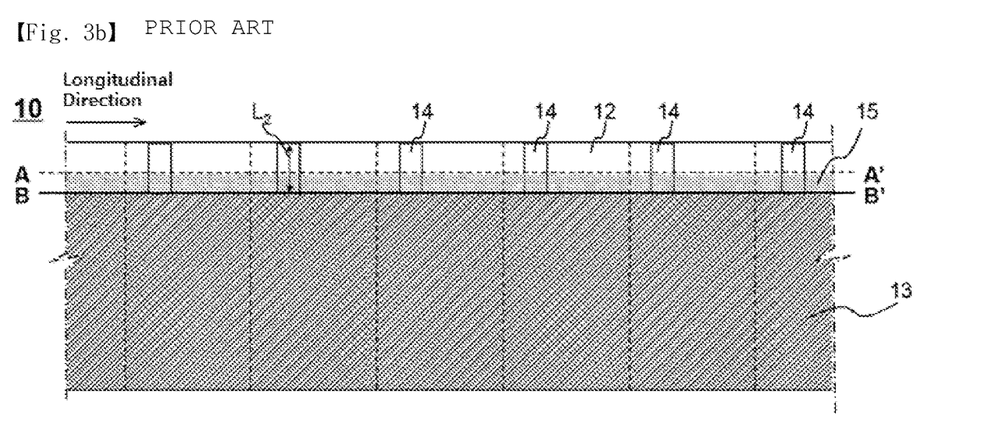
FIG. 3B is a schematic view of a positive electrode prepared by applying a positive electrode active material to a positive electrode current collector included in a battery cell according to the related art.

FIG. 3A illustrates a positive electrode prepared by applying a positive electrode active material to a positive electrode current collector included in an electrode group according to an embodiment of the present disclosure, and FIG. 3B illustrates a positive electrode prepared by applying a positive electrode active material to a positive electrode current collector included in a battery cell according to the related art.

Referring to FIG. 3A, a positive electrode 100 may be prepared by, in order for a non-coated part 102 to be formed in an upper portion adjacent to one end of a positive electrode current collector 101 in a longitudinal direction, applying a positive electrode active material 103 to a remaining portion so as to form a boundary (A-A') with the upper portion, and removing the remaining portions of the non-coated part 102, excluding a specific portion, by notching to form a positive electrode tab 104.

Referring to FIG. 3B, a positive electrode 10 may be prepared by, in order for a non-coated part 12 to be formed in an upper portion adjacent to one end of a positive electrode current collector 11 in a longitudinal direction, applying a positive electrode active material 13 to a remaining portion so as to form a boundary (B-B') with the upper portion, and removing the remaining portions of the non-coated part 12, excluding a specific portion, by notching to form a positive electrode tab 14.

The positive electrode 100 according to the present disclosure may be similar to and be prepared through the same process as the positive electrode 10 according to the related art. However, a length $L_1$ in which the positive electrode tab 104 protrudes upward may be shorter than a length $L_2$ of the positive electrode tab 14 of the related art, and an application area 103 of the positive electrode active material may be formed to be relatively larger than an application area 13 of the positive electrode active material of the related art.

That is, since the positive electrode 100 according to the present disclosure is connected to an electrode lead through a conductive connecting member as described below, the length of the positive electrode tab may not need to be as long as the conventional one. Therefore, the length of the positive electrode tab of the positive electrode according to the present disclosure may be shorter than that of the conventional one, and at the same time, the area to which the positive electrode active material is applied is relatively wider.

Only the positive electrode prepared by applying the positive electrode active material on the positive electrode current collector is shown in FIGS. 3A and 3B for the sake of convenience of explanation, but this structure may be also employed in a negative electrode prepared by applying a negative electrode active material on a negative electrode current collector, so that a battery cell prepared by stacking electrodes according to the present disclosure may have a relatively high energy density as compared with a battery cell of the same size.

This relative difference in energy density may be proportional to a difference 15 in the application area of the positive electrode active materials shown in FIGS. 3A and 3B, for example, an area 15 located between the boundary (A-A') and the boundary (B-B').

Figure 4:
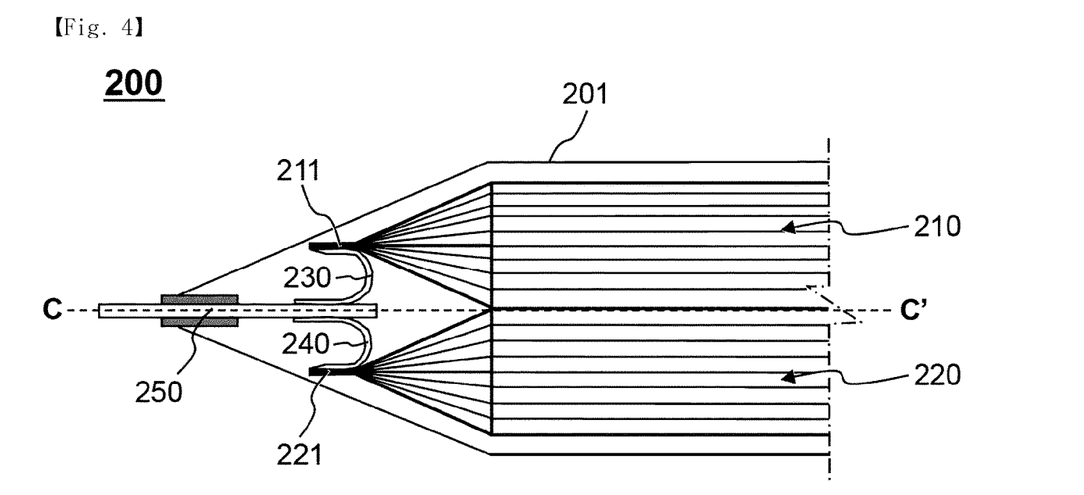
FIG. 4 is a schematic view of an inside of a battery cell according to an embodiment of the present disclosure, viewed from the side.
Figure 5:
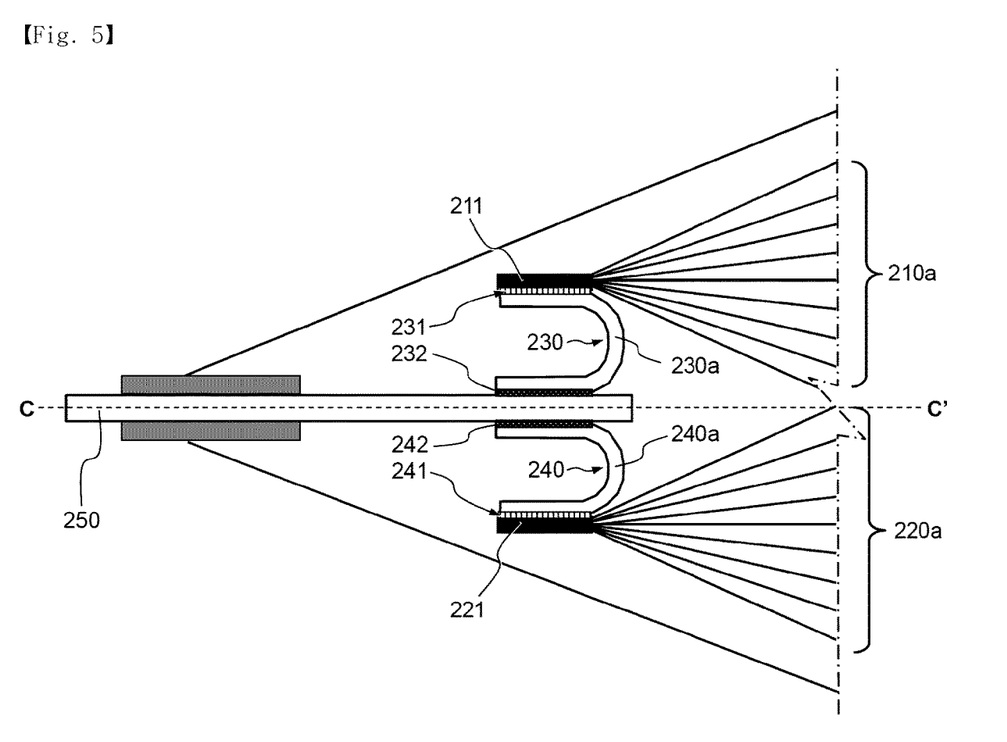
FIG. 5 is an enlarged partial view showing a state in which an electrode tab junction and a conductive connecting member of FIG. 4 are connected to each other.

FIG. 4 is a schematic view of an inside of a battery cell according to an embodiment of the present disclosure, viewed from the side, and FIG. 5 is an enlarged partial view showing a state in which an electrode tab junction and a conductive connecting member of FIG. 4 are connected to each other.

FIG. 4 is centered on the tab-lead coupled part of the battery cell, and referring to FIG. 4, in a battery case 201 of a battery cell 200 according to the present disclosure, a first electrode group 210 and a second electrode group 220 each having a structure in which electrodes (not shown) having a positive electrode/separator/negative electrode structure are stacked in a direction perpendicular to the ground, electrode tab junctions 211 and 221 in which electrode tabs protruding in one direction from the respective electrode groups 210 and 220 are coupled to each other so as to have a dense form, conductive connecting members 230 and 240 interposed between the electrode tab junctions 211 and 221 and an electrode lead 250, and the electrode lead 250 of which one end is connected to the conductive connecting members 230 and 240 and the other end is led out to the outside of the battery case 201 may all be included.

Referring to FIG. 4 and FIG. 5 together, the electrode tab junction 211 in which the electrode tabs 210a protruding from the first electrode group 210 in one direction are connected in a dense form and the electrode tab junction 221 in which the electrode tabs 220a protruding from the second electrode group 220 in one direction are connected in a dense form may be formed.

The conductive connecting members 230 and 240 located between the electrode tab junctions 211 and 221 and the electrode lead 250 may include first welding junctions 231 and 241 having one ends respectively welded to the electrode tab junctions 211 and 221 and second welding junctions 232 and 242 having the other ends welded to the electrode lead 250.

The first welding junctions 231 and 241 may be formed in parallel to the longitudinal direction of the electrode tab junctions 211 and 221, and the second welding junctions 232 and 242 may be formed in parallel to the longitudinal direction of the electrode lead 250. The parts 230a and 240a of the conductive connecting members 230 and 240 located between the first welding junctions 231 and 241 and the second welding junctions 232 and 242 may have a shape bent in a direction toward the electrode bodies 210 and 220 where the electrode tabs 210a and 220a are located, for example, a vertical cross sectional shape of a circular arc. However, the battery cell 200 according to the present disclosure is not limited to a structure in which a bent direction is directed toward the electrode bodies 210 and 220, but includes a structure that is bent to the opposite side of the electrode bodies 210 and 220.

The first electrode group 210 and the second electrode group 220 may be symmetrically formed with the longitudinal direction of the electrode lead 250 as a center axis C-C'.

Figure 6:
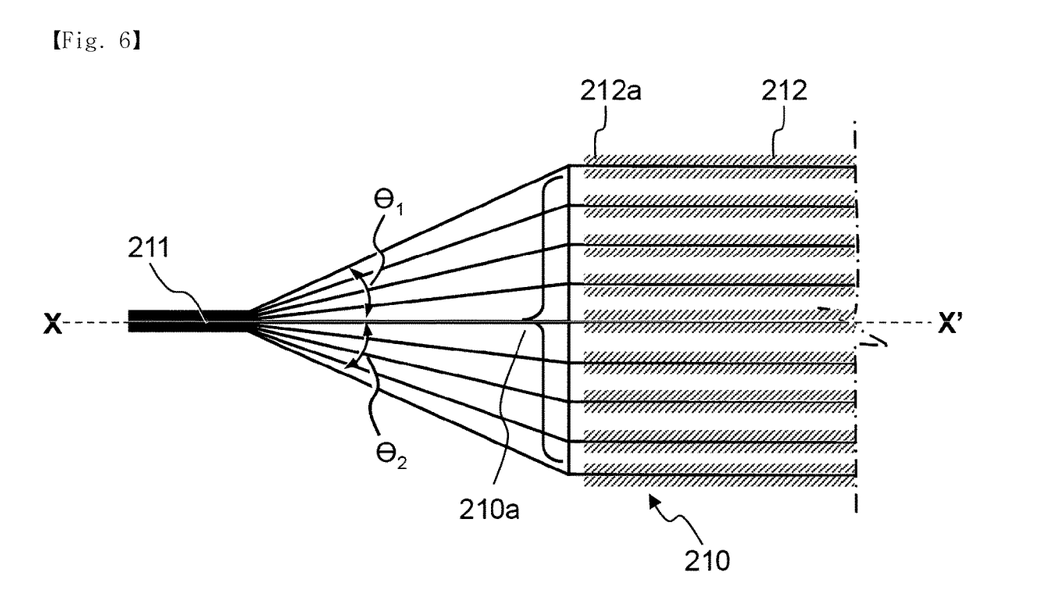
FIG. 6 is an enlarged partial view of a first electrode group of FIG. 4.

FIG. 6 is an enlarged partial view of the first electrode group of FIG. 4.

A plurality of electrodes included in the first electrode group 210 may include electrode non-coated parts 210a reaching an active material coated part 212 and the electrode tab junction 211, and the electrode non-coated parts 210a have a symmetrical structure with respect to a horizontal axis X-X' passing through the center of the first electrode group 210.

An angle formed with the horizontal axis X-X' by an outermost electrode non-coated part located on the upper side and an outermost electrode non-coated part located on the lower side with respect to the horizontal axis X-X' may be respectively $\theta_1$ and $\theta_2$, and $\theta_1$ and $\theta_2$ are the same angle as each other.

Although only the angles formed by the outermost electrode non-coated parts are shown in FIG. 6, the electrode non-coated parts 210a may have a symmetrical structure with respect to the horizontal axis X-X' passing through the center of the first electrode group 210, and therefore, the electrode non-coated parts located between the outermost electrode non-coated part on the upper side and the horizontal axis X-X' and the electrode non-coated parts located between the outermost electrode non-coated part on the lower side and the horizontal axis X-X' may have the same angle with respect to the horizontal axis X-X'.

With such a structure, since the angle of the electrode non-coated part bent to form the electrode tab may be constant, in contrast to the related art, the electrode non-coated part does not bend so drastically so as to reach the electrode lead, so that excessive stress may be prevented from acting on the electrode tab portion. Also, it possible to prevent the stress from acting unbalanced because the electrode non-coated parts are formed in a symmetrical structure.

Figure 7:
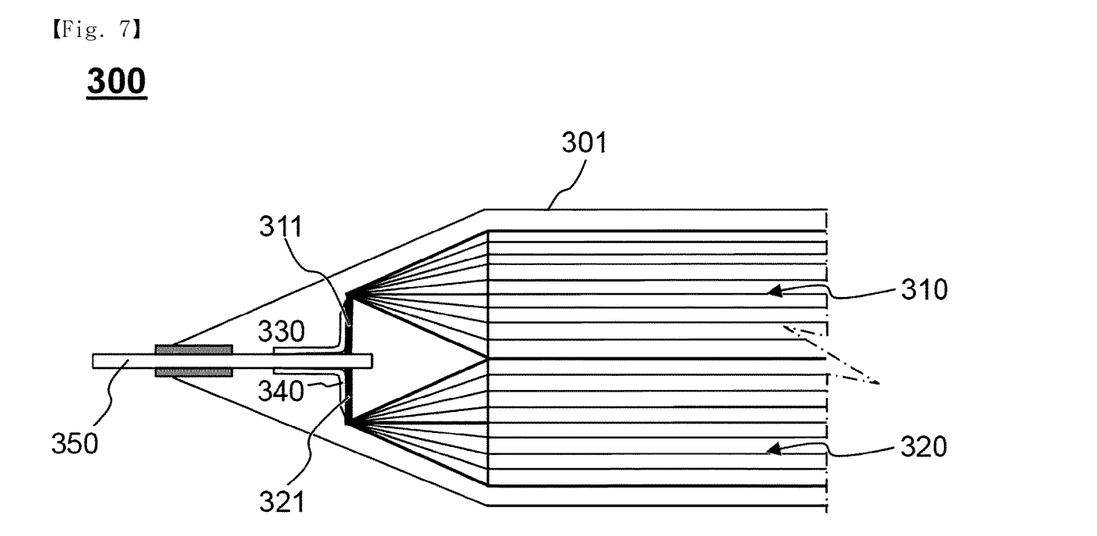
FIG. 7 is a schematic view of an inside of a battery cell according to an embodiment of the present disclosure, viewed from the side.
Figure 8:
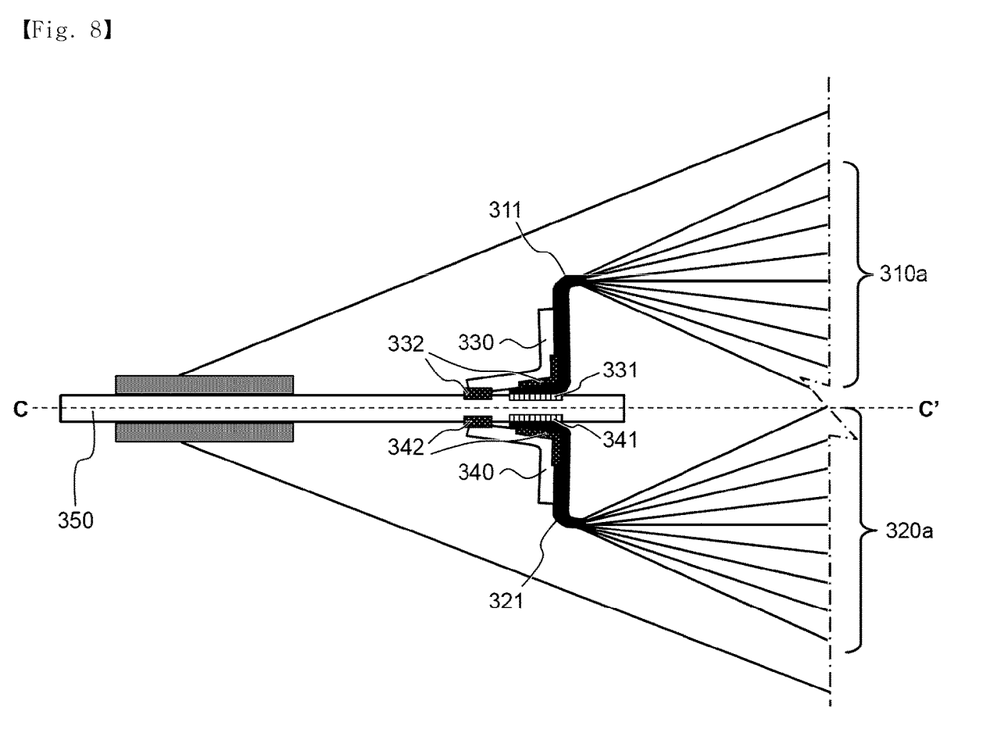
FIG. 8 is an enlarged partial view showing a state in which an electrode tab junction and a conductive connecting member of FIG. 7 are connected to each other.

FIG. 7 is a perspective view of a battery cell according to an embodiment of the present disclosure, viewed from the side, and FIG. 8 is an enlarged partial view showing a state in which an electrode tab junction and a conductive connecting member included in the battery cell of FIG. 7 are connected to each other.

Referring to FIG. 7, in a battery case 301 of a battery cell 300 according to an embodiment of the present disclosure, a first electrode group 310 and a second electrode group 320, electrode tab junctions 311 and 321 in which electrode tabs protruding in one direction from the each of the electrode groups 310 and 320 are coupled in a dense form, conductive connecting members 330 and 340 interposed between the electrode tab junctions 311 and 321 and an electrode lead 350, and the electrode lead 350 of which one end 350a is connected to the conductive connecting members 330 and 340 and the other end is led out to the outside of the battery case 301 may all be included, and only a portion of the battery cell 300 is shown.

Referring to FIGS. 6 and FIG. 7 together, the electrode tab junction 311 in which electrode tabs 310a protruding from the first electrode group 310 in one direction are connected in a dense form and the electrode tab junction 321 in which electrode tabs 320a protruding from the second electrode group 320 in one direction are connected in a dense form may be formed on one side of the battery cell 300.

One ends of the electrode tab junctions 311 and 321 may include first welding junctions 331 and 341 formed by being directly coupled to one end of the electrode lead and second welding junctions 332 and 342 in which the conductive connecting members 330 and 340 located on the opposite side of the first welding junctions 331 and 341 are respectively coupled to the electrode tab junctions 311 and 321 and the electrode lead 350.

One ends of the electrode tab junctions 311 and 321 located adjacent to the electrode lead 350 may be coupled to the electrode lead 350 by welding in a partially bent state to form the first welding junctions 331 and 341.

Since the conductive connecting members 330 and 340 are respectively coupled to the electrode lead 350 and the electrode tab junctions 311 and 321, the second welding junctions 332 and 342 may be relatively larger than the first welding junctions 331 and 341 and may be bent to correspond to a shape of the outer surface of the electrode tab junctions 311 and 321 and the electrode lead 350.

The first electrode group 310 and the second electrode group 320 may be formed symmetrically with the longitudinal direction of the electrode lead 350 as a center axis C-C'.

It should be understood by those skilled in the art that various changes may be made without departing from the spirit and scope of the present disclosure.

The invention claimed is:

1. A battery cell comprising:
two or more electrode groups each having a structure in which a positive electrode, a negative electrode, and a separator interposed between the positive electrode and the negative electrode are stacked,
wherein a first electrode group of the two or more electrode groups includes an electrode tab junction extending in a longitudinal direction on one side that is electrically connected to a first conductive connecting member, a second electrode group of the two or more electrode groups includes an electrode tab junction extending in the longitudinal direction on one side that is electrically connected to a second conductive connecting member, and both of the first and second conductive connecting members are electrically connected to an electrode lead drawn to an outside of a battery case, wherein the entire portion of the electrode lead disposed within the battery case extends in the longitudinal direction,
wherein each of the first and second conductive connecting members has a structure including a first welding junction formed between one end of the respective conductive connecting member and the respective electrode tab junction and a second welding junction formed between another end of the respective conductive connecting member and the electrode lead, wherein in each of the first and second conductive connecting members, the first welding junction and the second welding junction extend in the longitudinal direction and parallel to the entire portion of the electrode lead disposed within the battery case,
wherein each of the first and second conductive connecting members has a bent part bent toward an electrode body between the first welding junction and the second welding junction, at least a portion of the bent part being separated from the electrode tab junction and the electrode lead,
wherein the first electrode group and the second electrode group are arranged symmetrically with respect to the electrode lead,
wherein, in the electrodes forming each of the two or more electrode groups, bent angles of an electrode non-coated part extending from an end of an active material coated part to the respective electrode tab junction are symmetrical with respect to a horizontal axis passing through the center of the respective electrode group, and
wherein outermost electrodes of each of the two or more electrode groups have a bent angle of about 20 to 50 degrees.

2. The battery cell of claim 1, wherein each of the first and second conductive connecting members is made of a metal strip, and the bent part is bent so as to have a circular arc shape in a vertical cross section.

3. The battery cell of claim 1, wherein upper and lower surfaces of the electrode lead have an insulating film attached thereto for securing electrical insulation in the battery case.

4. The battery cell of claim 1, wherein the two or more electrode groups are sealed together with an electrolytic solution within the battery case the battery case being made of a laminate sheet.

5. The battery cell of claim 1, wherein each of the two or more electrode groups is a stacked type electrode group or a stacked/folding type electrode group.

6. A device comprising the battery cell of claim 1 as a power source.

7. A battery cell comprising:
two or more electrode groups each having a structure in which a positive electrode, a negative electrode, and a separator interposed between the positive electrode and the negative electrode are stacked,
wherein each of the two or more electrode groups includes an electrode tab junction on one side,
wherein in each of the two or more electrode groups, an end of the electrode tab junction is directly coupled to an electrode lead drawn to an outside of a battery case at a first welding junction, and
wherein in each of the two or more electrode groups, the electrode group is electrically connected to a conductive connecting member that is coupled at one second welding junction to the electrode tab junction of the electrode group at an opposite side of the electrode tab junction from the first welding junction, and directly coupled at another second welding junction to the electrode lead, wherein the electrode lead, each of the first welding junctions, and at least a portion of each of the second welding junctions extend in a single longitudinal direction.

8. The battery cell of claim 7, wherein in each of the two or more electrode groups, the first welding junction has a structure in which a part of the electrode tab junction is coupled to the electrode lead in a bent state.

9. The battery cell of claim 7, wherein in each of the two or more electrode groups, a total size of the two second welding junctions is relatively larger than a size of the first welding junction.

10. The battery cell of claim 7, wherein in each of the two or more electrode groups, the conductive connecting member has a structure in which at least one of the two second welding junctions is formed to be in a bent state corresponding to the electrode tab junction and a shape of an outer surface of the electrode lead.

11. The battery cell of claim 7,
wherein the two or more electrode groups are composed of a first electrode group and a second electrode group,
the first electrode group and the second electrode group are arranged symmetrically with respect to the electrode lead,
wherein, in the electrodes forming each of the two or more electrode groups, bent angles of an electrode non-coated part extending from an end of an active material coated part to the respective electrode tab junction are symmetrical with respect to a horizontal axis passing through the center of the respective electrode group, and
wherein in each of the two or more electrode groups, a part of the electrode tab junction is bent and coupled to the electrode lead in a state in which the bent angles of the electrode non-coated parts are symmetrical with respect to the horizontal axis passing through the center of the electrode group.

12. The battery cell of claim 7, wherein the entire portion of the electrode lead disposed within the battery case extends in the longitudinal direction.

\* \* \* \* \*